US010710549B2

(12) United States Patent
Finney

(10) Patent No.: US 10,710,549 B2
(45) Date of Patent: Jul. 14, 2020

(54) SEAT BELT PULL THROUGH DEVICE FOR A CAR SEAT CALLED A BUCKLEZE PULL

(71) Applicant: Angela Finney, Anderson, IN (US)

(72) Inventor: Angela Finney, Anderson, IN (US)

(*) Notice: Subject to any disclaimer, the term of this patent is extended or adjusted under 35 U.S.C. 154(b) by 119 days.

(21) Appl. No.: 16/129,001

(22) Filed: Sep. 12, 2018

(65) Prior Publication Data

US 2019/0084523 A1 Mar. 21, 2019

Related U.S. Application Data

(60) Provisional application No. 62/559,215, filed on Sep. 15, 2017.

(51) Int. Cl.

*B60R 22/30* (2006.01)
*B60R 22/10* (2006.01)
*B60N 2/26* (2006.01)
*B60N 2/28* (2006.01)
*B60R 22/03* (2006.01)

(52) U.S. Cl.

CPC .............. *B60R 22/30* (2013.01); *B60N 2/265* (2013.01); *B60N 2/2806* (2013.01); *B60R 22/03* (2013.01); *B60R 22/105* (2013.01); *B60N 2/2803* (2013.01); *B60N 2002/2815* (2013.01)

(58) Field of Classification Search

CPC ....... B60R 22/03; B60R 22/105; B60R 22/30; B60N 2/265; B60N 2/2806; B60N 2002/2815; B60N 2002/2818; B60N 2/2803

See application file for complete search history.

(56) References Cited

U.S. PATENT DOCUMENTS

| | | | | |
|---|---|---|---|---|
| 4,645,231 A | | 2/1987 | Takeda | |
| 5,197,176 A | * | 3/1993 | Reese | B25B 33/00 29/270 |
| 5,286,090 A | | 2/1994 | Templin et al. | |
| 5,496,083 A | * | 3/1996 | Shouse, Jr. | B25B 9/00 29/278 |
| 5,620,231 A | * | 4/1997 | Marker | B60N 2/265 29/278 |
| D384,255 S | * | 9/1997 | Beckner | D8/16 |
| 5,685,586 A | * | 11/1997 | Miller | B25J 1/04 294/175 |
| 5,954,397 A | * | 9/1999 | Czernakowski | B60N 2/2806 297/250.1 |
| 6,343,841 B1 | | 2/2002 | Gregg | |

(Continued)

*Primary Examiner* — Laura Freedman

(74) *Attorney, Agent, or Firm* — Ritchison Law Offices, PC; John D Ritchison

(57) ABSTRACT

A seat belt pull through device for a car seat used in a vehicle. It allows an occupant, a child, to remain comfortably in a semi-erect or upright position while placed in a toddler or infant car safety seat. The device facilitates fast and easy installation of the car seat and connection of the car seat to the existing seat and shoulder belts already with the vehicle. It greatly simplifies the insertion of the vehicle belts through the car seat and removes the cumbersome and tiresome fishing of a limp belt through the tight, small openings in the car seat structure. The device includes an extended sheath with a hook and protector flaps to enable the vehicle belt to be inserted into a seat belt slot of the car seat, pushed through and removably connected to the seat belt system of the entire vehicle.

19 Claims, 8 Drawing Sheets

31

60

(56) References Cited

U.S. PATENT DOCUMENTS

Figure 2:
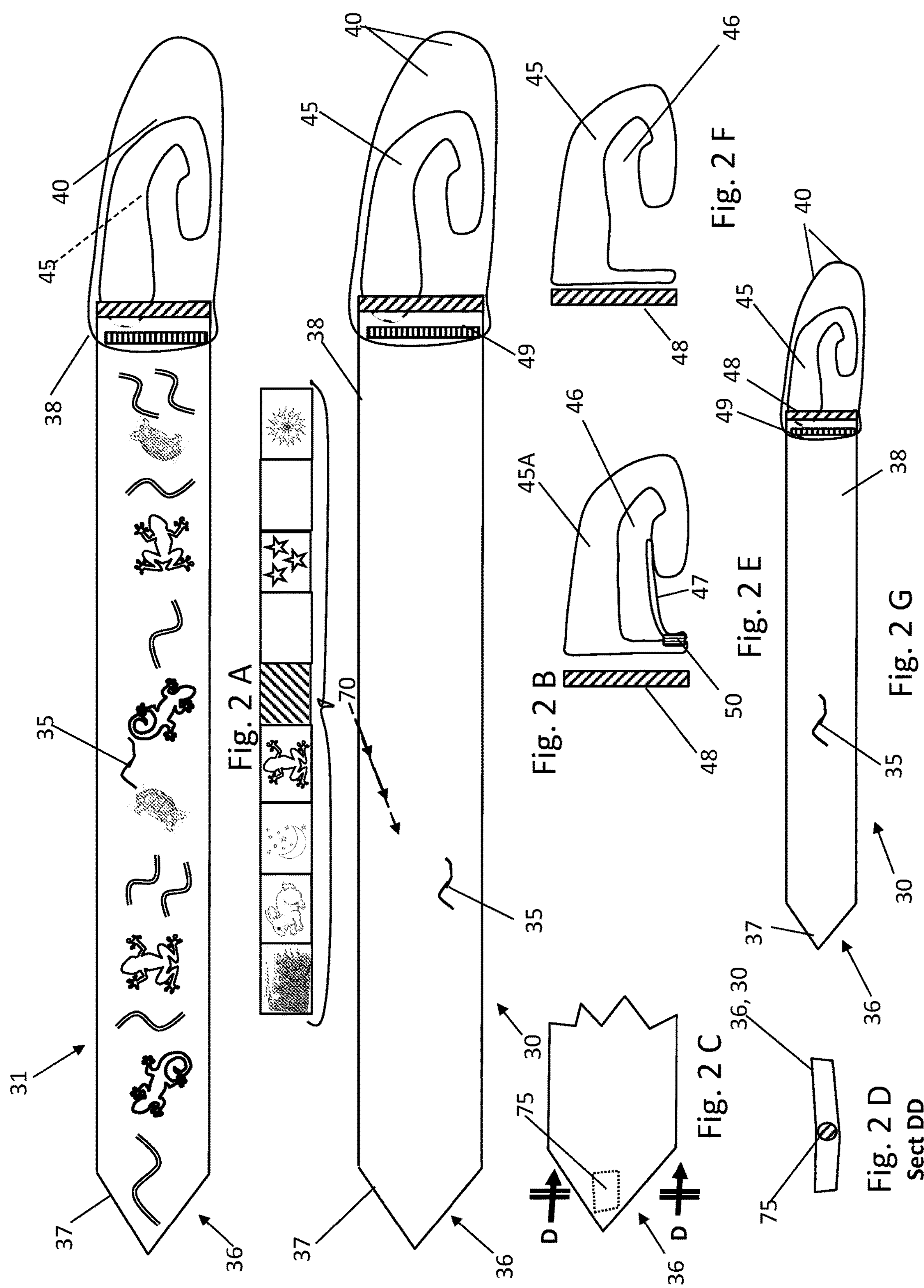

| | | | | |
|---|---|---|---|---|
| 6,430,797 | B1 * | 8/2002 | Dittmar | B25B 9/00 29/270 |
| 6,749,260 | B2 * | 6/2004 | Abel | B60N 2/2806 242/388.3 |
| 6,827,400 | B2 | 12/2004 | Birum | |
| 6,969,122 | B2 | 11/2005 | Sachs | |
| 7,093,905 | B1 * | 8/2006 | George | B60N 2/2806 297/463.1 |
| 7,210,743 | B1 * | 5/2007 | Dale | B60N 2/2806 297/463.2 |
| 8,413,304 | B1 * | 4/2013 | Tipton | B25G 1/10 16/422 |
| 9,969,352 | B2 * | 5/2018 | Noguera | B60R 22/30 |
| 10,023,078 | B2 * | 7/2018 | Kitt | B60R 22/105 |
| D828,154 | S * | 9/2018 | Senter | D8/499 |
| 2002/0092135 | A1 * | 7/2002 | Mancini | B60N 2/2806 24/33 R |
| 2004/0080203 | A1 * | 4/2004 | Meloul | B60R 22/023 297/463.1 |
| 2006/0267394 | A1 | 11/2006 | David | |
| 2007/0075580 | A1 | 4/2007 | David | |
| 2008/0115637 | A1 * | 5/2008 | Mayfield | B60N 2/2803 81/487 |
| 2008/0290717 | A1 * | 11/2008 | Klapp | B60R 22/03 297/468 |
| 2009/0066144 | A1 * | 3/2009 | Fillie | B60R 22/024 297/463.1 |
| 2012/0007398 | A1 | 1/2012 | Fritz | |
| 2012/0272926 | A1 * | 11/2012 | Zack | A47D 13/086 119/857 |

* cited by examiner

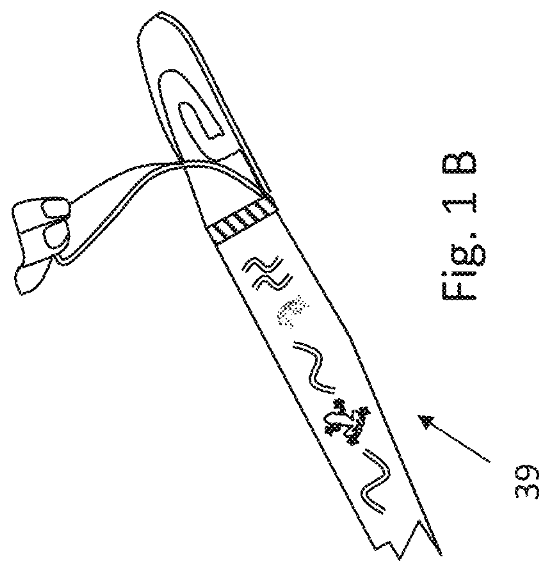
Fig. 1 B
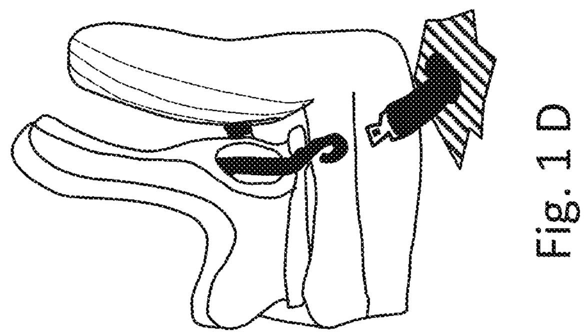
Fig. 1 D
60
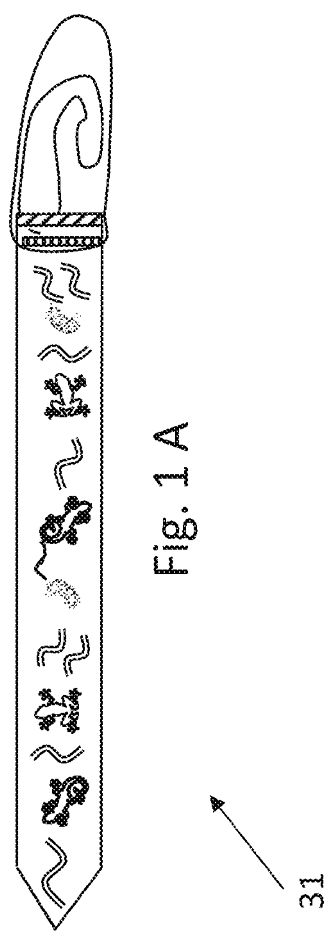
Fig. 1 A
30
Fig. 1 C 40
45
38
35
31
37
36

70
49
30

48
45A
46
47
50

75
D 36, 30

Sect DD 45
40
38
31

40
45
40
31

36
37
31

76
Connecting Device to Seatbelt
40
45
40
90
49
38
31
35

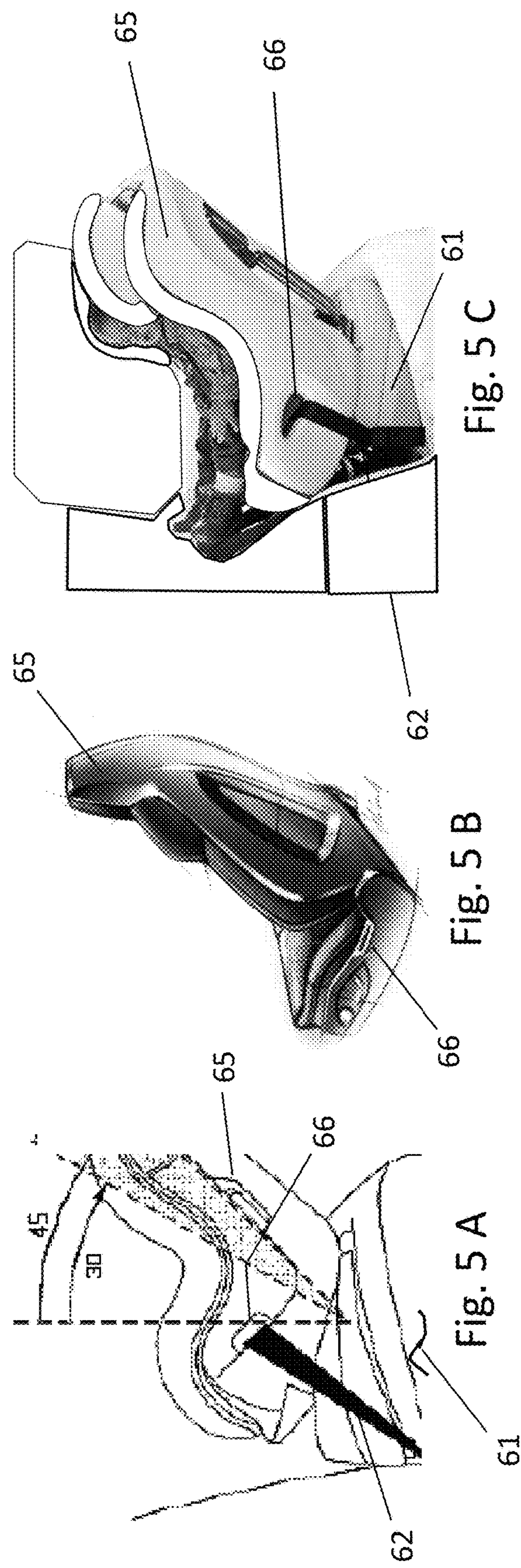
Fig. 5 A
Fig. 5 B
Fig. 5 C
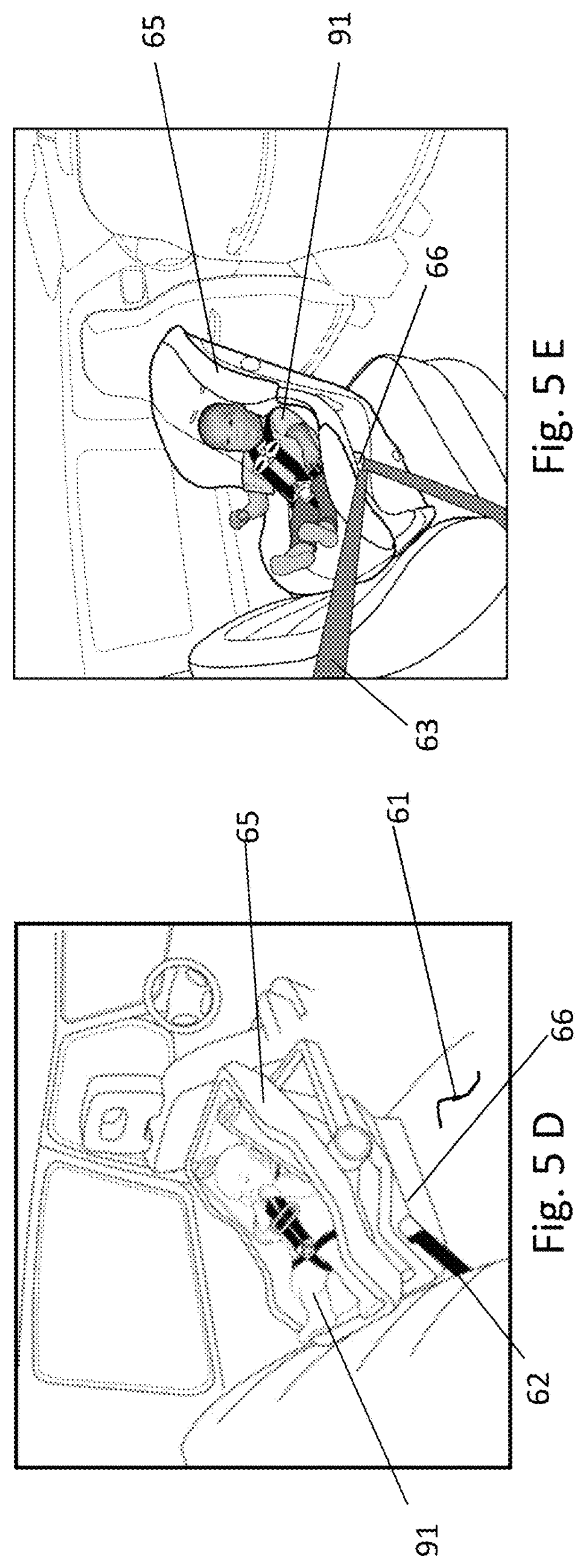
Fig. 5 D
Fig. 5 E

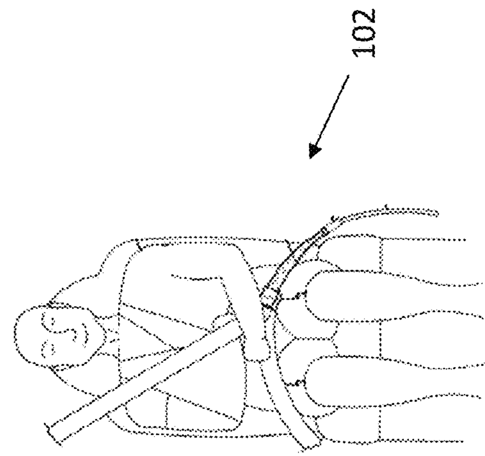
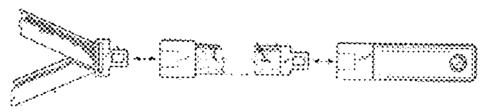
Fig. 8 B
Prior Art
US Patent 6,969,122
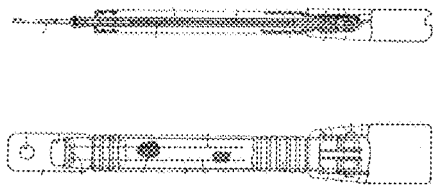
Fig 8 E
Prior Art
US Patent 4,641,235
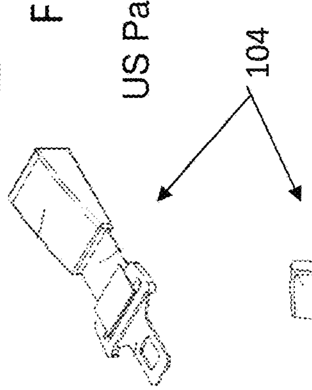
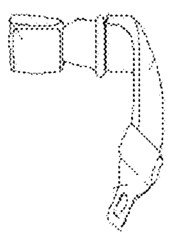
Fig. 8 D
Prior Art
US Patent Appn. 2006/0267394
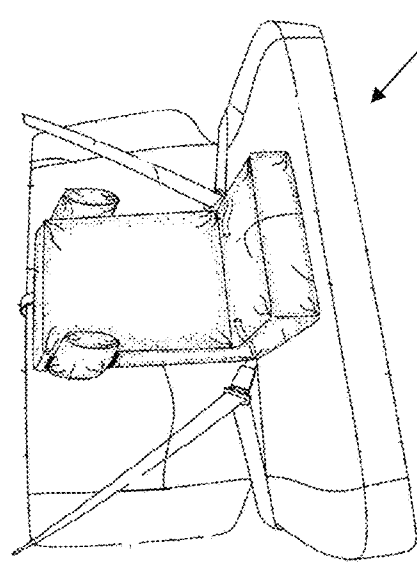
Fig. 8 A
Prior Art
US Patent 6,827,400
Fig. 8 C
Prior Art
US Patent 6,343,841

SEAT BELT PULL THROUGH DEVICE FOR A CAR SEAT CALLED A BUCKLEZE PULL

CROSS-REFERENCE TO RELATED APPLICATIONS

This application claims the benefit of United States Provisional Patent Application with Ser. No. 62/559,215 filed Sep. 15, 2017, by Angela Finney and entitled "A seat belt pull through device for a car seat called a Buckleze Pull".

FIELD OF INVENTION

This invention relates to a seat belt pull through device for a car seat called a Buckleze Pull. This invention is in the field for securing web belts such as seat belts. The invention relates generally to an assist device for vehicular safety devices and systems for use in a vehicle that allows an occupant, e.g., a child, to comfortably sleep in a semi-erect or upright position while wearing conventional lap and shoulder safety belts. The present device is a pull through device to assist attaching the car seat to the existing seat belt system of a vehicle.

The present disclosure assists the placement of a child seat which typically includes a base held in place on an underlying passenger seat by an anchor belt coupled to the vehicle and a juvenile seat coupled to the base. The present device is an article of manufacture, and a method for attaching a child safety seat in a vehicle and, in particular to a device, an article of manufacture, and a method, enabling a quick and efficient way to fasten and release the belt buckles which fix the child safety seat or child sitting in the child booster safety seat to the seat's location on the vehicle seat.

The seat belt pull through device for a car seat called a Buckleze Pull is a readily made and available for universal mounting of car seats for babies and infants into vehicle seats by the seat belt system of the vehicle. The applications of the device anticipate original equipment with the sales of car seats and as an accessory as aftermarket sales and uses.

FEDERALLY SPONSORED RESEARCH

None.

SEQUENCE LISTING OR PROGRAM

None.

BACKGROUND—FIELD OF INVENTION AND PRIOR ART

As far as known, there are no seat belt pull through devices for a car seat called a Buckleze Pull or the like. It is believed that this product is unique in its design and technologies.

BACKGROUND

This background as to seat belts and child safety seats should be useful. Enacted laws require seats within automobiles for restraining a child or infant. Typically, the seats include a harness which is releasably securable around the child with the harness passing over the shoulders and having a front end releasably locked to a buckle or similar fastening device. According to the National Transportation Safety Board, motor vehicle crashes (MVCs) remain the leading cause of death in the United States (2004), killing about 33 children ten years and under every week. Research has shown that serious injuries and fatalities can be prevented in MVCs with proper use of seat belts and child restraint devices. For example, according to the National Highway Traffic Safety Administration (NHTSA) U.S. Department of Transportation, child restraints have been shown to be 69 percent effective in reducing the risk of death to infants and 47 percent effective for children between the ages of one and four.

The present invention relates to a device, an article of manufacture, and a method for setting up a child safety seat in a vehicle and, in particular to a device, an article of manufacture, and a method, enabling a quick and efficient way to fasten and release the belt buckles which fix the child safety seat or child sitting in the child booster safety seat to the seat's location on the vehicle seat. Buckling a child to a vehicle seat with the vehicle's seatbelts does not provide sufficient protection in case of an emergency braking or in an accident, for reasons such as the following:

a. The seat belts are not sufficiently sung on a small body and do not comprise a sufficient downward force.
b. The shoulder belt could lacerate the child's neck.
c. Most children are not mature enough to be seated in a seat designated for adults.
d. Children cannot bend their knees at the end of the seat when their backs are against the backrest of the seat.

In order to overcome these difficulties, the booster seat, which is a seat that raises the child and provides a higher sitting height so the adult lap and shoulder belts fit better, has been available for approximately thirty years. The standard recommendation is to use booster seats for children of ages 4 to 8, weighing 20 to 40 kg.

Problem Solved

The improvement and problem solved as to car seats and placing them into vehicle seats is facilitating the attachment of the car seat to the vehicle. This is done by permitting parents, older siblings, grandparents and nannies a way to easily place and secure the car seat into the vehicle. Modern attachment of vehicle belts to the car seat is often through slots in the car seats. The lack of room, awkward leaning and reaching detracts from easy installation. This results in car seats left unattached or families buying extra seats to not hassle with moving the car seats from one vehicle to the next.

PRIOR ART

A novelty search revealed no other devices or systems that anticipate or show the seat belt pull through device for a car seat called a Buckleze Pull as obvious. The search shows:

A. Patent Application No. 20120007398 was submitted by Ward Fritz for a device called a "Child restraint for vehicle". This taught a child restraint that includes a base, a seat, and an anchor belt. The anchor belt holds the base in place on a passenger seat of a vehicle. The seat mounts on the base and supports a child or infant for travel in the vehicle above the base.
B. A U.S. Pat. No. 5,286,090 was issued in 1994 by Rajiv Menon for an apparatus entitled "Web adjuster and lock assembly for a child restraint seat". This shows a web adjuster and lock assembly for a child restraint seat that has a buckle lock assembly which is operably coupled to a web adjuster. The child restraint seat includes a harness which includes a buckle tongue on one end which engages with a buckle lock of the buckle lock assembly, and includes adjacent its other end a tightening web which is received through the web adjuster. The buckle lock of the buckle lock assembly is movable between a rest position, a locked position, and a release position. The web adjuster includes a friction surface which engages the tightening web when the web adjuster is in its web engageable position but is movable to a free position wherein the friction surface is disengaged from the tightening web allowing the web to move in both directions with respect to the web adjuster assembly. The buckle lock assembly is coupled to the web adjuster assembly such that when the buckle lock moves from its locked position to its rest position, the web adjuster assembly moves from its web engageable position to its free position.

C. U.S. Pat. No. 6,827,400 was issued in 2004 to Herbert L Birum. This was named a "Sleeping occupant protection system for vehicles". Here is demonstrated a comfort system for use at the middle seat of a vehicle that has a pair of seats laterally on either side of the middle seat, with each lateral seat including a conventional seat belt, a backrest and a support surface. The comfort system comprises a base section having a pair of sides, an upwardly directed section having a pair of padded sides, and a pair of padded headrests located on respective sides of the upwardly directed section. With this arrangement when an occupant, e.g., a child, is seated on either lateral seat and wearing the seat belt the child may comfortably lean against the comfort system so that the occupant's head engages the headrest on the adjacent to side and at least a portion of the occupant's upper torso engages that side of the upwardly directed section.

D. U.S. Pat. No. 6,969,122 was issued to David A. Sachs in 2005 for a device called a "Seat belt extender". This provides a seat belt extender that is a length of material having limited flexibility, with a male seat belt latch tongue extending from one end and a female seat belt latch receptacle extending from the opposite end. The seat belt extender is installed in an existing, conventional three point seat belt system in a vehicle by inserting the tongue into the receptacle of the short anchor strap generally located at the inboard side of the seat, near the center of the vehicle. The semi-rigid nature of the present extender causes it to remain generally upright when secured to the anchor strap, thus enabling a person having limited upper body mobility to easily access the receptacle end of the extender with the tongue of the existing belt and shoulder strap assembly. The present extender also serves to position the shoulder strap more toward the center of the upper body of an occupant.

E. US Patent Application No. 20060267394 was submitted by Yair David for an apparatus entitled an "Improvement of child safety seat set-up in a vehicle". Shown here is a seatbelt adaptor and a method to be used to improve of the setup of a child safety seat in a vehicle. The seatbelt adaptor is made of a central lengthening device and two connectors that are disposed at both ends of the central lengthening device. The connectors are suited for the buckles of the vehicle's seatbelts, and wherein the length of the seatbelt adaptor is suited to improve upon the latching of the buckle of the seatbelt that secures a child seated in a safety seat within a vehicle.

F. U.S. Pat. No. 4,645,231 was issued to Juichiro Takada in 1987 for a device known as a "Stalk for a seat belt buckle or the like". Taught here is a stalk for supporting a safety belt buckle or the like that is in a generally predetermined position spaced-apart from an anchor member and made of a single piece of belt webbing material that is folded lengthwise along two folds to superpose both edge portions on the center portion and position the selvage edges closely adjacent each other. The edge portions are stitched to the center portion, thereby providing a double thickness of belt webbing of substantially half the width of the webbing material. A portion of one end of the folded and stitched webbing piece is folded back on itself and overlaps a portion of the other end, and said end portions are joined together to form the webbing piece into a loop. The loop passes through a hole in the anchor member, and the portions of the loop on opposite sides of the anchor member lie substantially flat closely adjacent each other and are stiffened and stabilized by a layer of polymeric material injected and molded in situ between said portions of the loop.

G. Another US Patent Application No. 20070075580 was issued also submitted by Yair David for a "Child safety seat-up in a vehicle". This invention demonstrates a seatbelt adaptor and a method to be used to improve of the setup of a child safety seat in a vehicle. Here the seatbelt adaptor is made of a central lengthening device and two connectors disposed at both ends of the central lengthening device. The connectors are suited for the buckles of the vehicle's seatbelts, and wherein the length of the seatbelt adaptor is suited to improve upon the latching of the buckle of the seatbelt that secures a child seated in a safety seat within a vehicle. The geometric shape of the safety seat conforms to the geometric shape of the seatbelt adaptor.

H. U.S. Pat. No. 6,343,841 was issued in 2002 for a "Seat belt extension" to Robert W. Gregg. The technology shown here is a seat belt extension for extending a seat belt while preventing twisting of the seat belt. The seat belt extension here includes a first elongate panel having a first end, a second end and a middle portion. The first panel has a generally rectangular configuration. A second elongate panel has four edges, wherein a first, a second and a third of the edges are fixedly secured to the first panel. A pocket is formed between the second panel and the first panel. An insert is inserted in the pocket between the first panel and the second panel. A female portion of a seat belt buckle is fixedly coupled to the first end of the first panel. A male portion of a seat belt buckle, the male portion is fixedly coupled to the second end of the first panel.

Reviewing all of these prior art devices it appears they have failed to singly provide the disclosed a simple and effective insert for siding the installation of a car seat into a vehicle. The prior art neither anticipates the Finney device nor renders it obvious from the cite by itself or even when it is combined with other analogous prior art concepts. Therefore, the novelty of the Finney device is believed in place.

SUMMARY OF THE INVENTION

This invention is a seat belt pull through device for a car seat called a Buckleze Pull. The preferred embodiment of a seat belt pull through device for a car seat called a Buckleze Pull A seat belt pull through device 30 for a car seat called a Buckleze Pull an accessory to facilitate the attachment of a car seat to a vehicle seat belt system, the device is made of durable materials and is comprised of: (a) an extended sheath with an insert end and a hook end, the insert end further comprised with a tapered or pointed end and the hook end further comprised of a hook; (b) a pair of protector flaps made of flexible and durable material, situated and contiguous with the hook; (c) a means to connect hook to hook end of device, and (d) a means to connect the pair of flaps to the hook end of device wherein the device is inserted into a seat belt slot of the car seat and pushed through and removably connected to the seat belt system of the vehicle.

The newly invented seat belt pull through device for a car seat called a Buckleze Pull for various applications may be manufactured at low volumes by very simple means and in high volume production by more complex and controlled systems.

Objects and Advantages

There are several objects and advantages of the A seat belt pull through device for a car seat called a Buckleze Pull. The device advantages and benefits include but are not limited to:

| Item | Advantages |
|---|---|
| 1 | Helps parents and grandparents manage strap |
| 2 | Prevents cramps and injuries connecting child seat |
| 3 | Is ergonomically built |
| 4 | Can be made from available materials and processes |
| 5 | Is a universal size for all car seats |
| 6 | Is used without additional tools |
| 7 | Facilitates attaching of car seat to vehicle |
| 8 | Reduces need to purchase car seats for each vehicle owned |

Finally, other advantages and additional features of the present seat belt pull through device for a car seat called a Buckleze Pull will be more apparent from the accompanying drawings and from the full description of the device. For one skilled in the art of car seat, vehicle seats and safety/seat belt systems and devices, it is readily understood that the features shown in the examples with this product are readily adapted to other types of seat belt and seat systems and devices.

DESCRIPTION OF THE DRAWINGS—FIGURES

The accompanying drawings, which are incorporated in and constitute a part of this specification, illustrate an embodiment of the seat belt pull through device for a car seat called a Buckleze Pull that is preferred. The drawings together with the summary description given above and a detailed description given below serve to explain the principles of the pull through device. It is understood, however, that the seat belt pull through device for a car seat called a Buckleze Pull is not limited to only the precise arrangements and instrumentalities shown.

FIGS. 1 A through 1 D are sketches of the general seat belt pull through device for a car seat called a Buckleze Pull.

FIGS. 2 A through 2 G are sketches of the general seat belt pull through device 30 with components and features noted.

Figure 3:
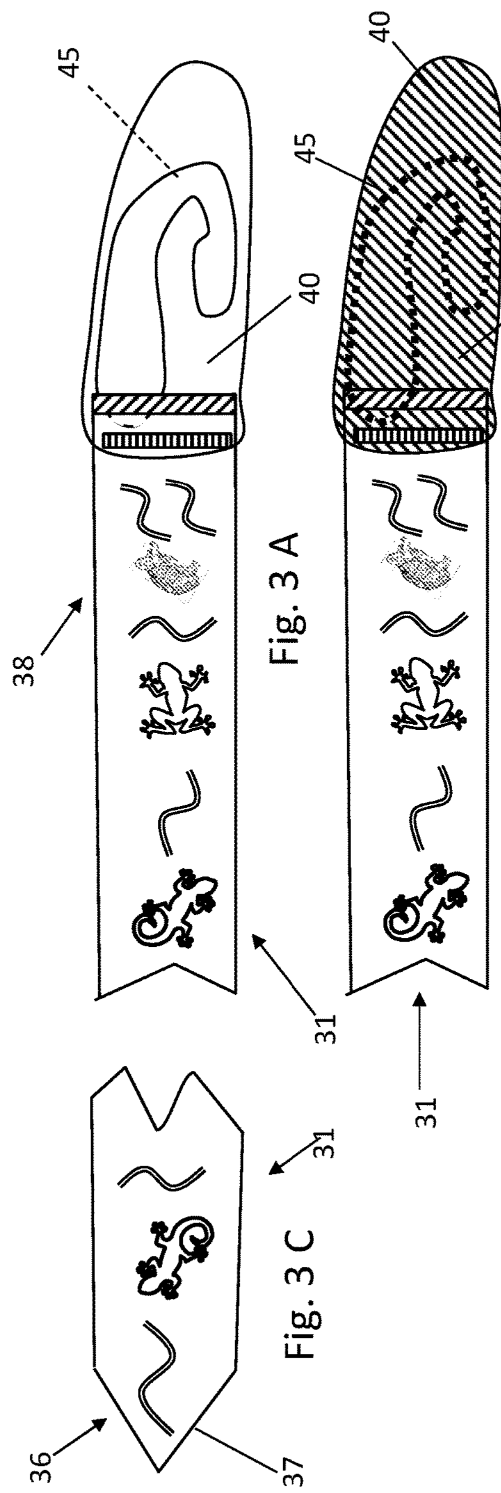

FIG. 3 A through 3 D are more sketches of the seat belt strap pull through device with the components shown from generally a top view.

Figure 4:
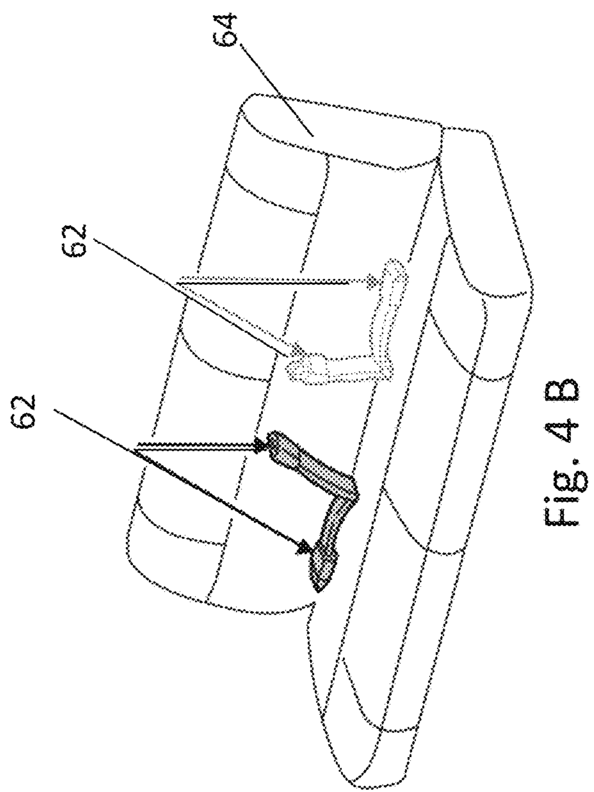
Figure 4:
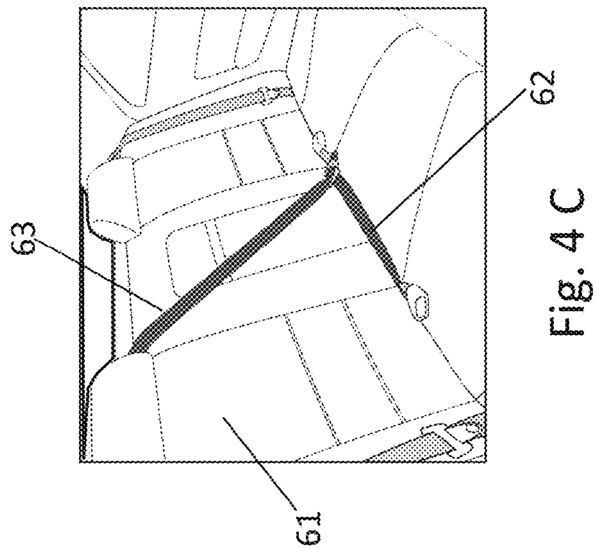
Figure 4:
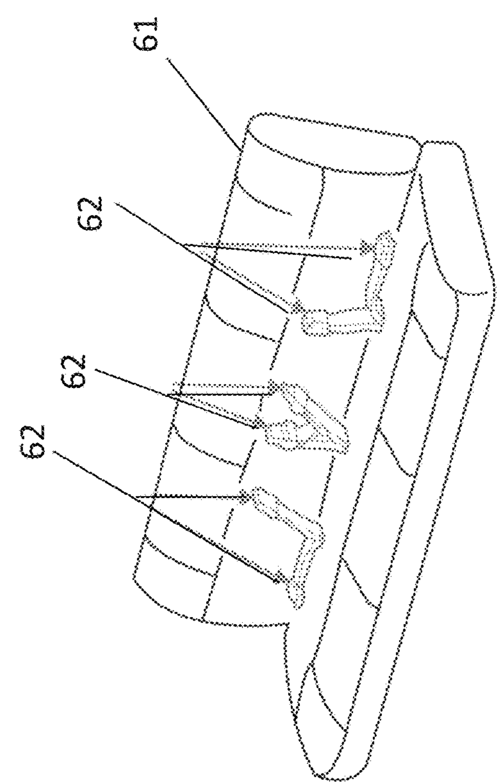

FIGS. 4 A through 4 C are sketches automobile and vehicle seats with seat belt arrangements shown.

FIGS. 5 A through 5 E are sketches of rear facing baby car seats with seat belt interconnects shown.

Figure 6:
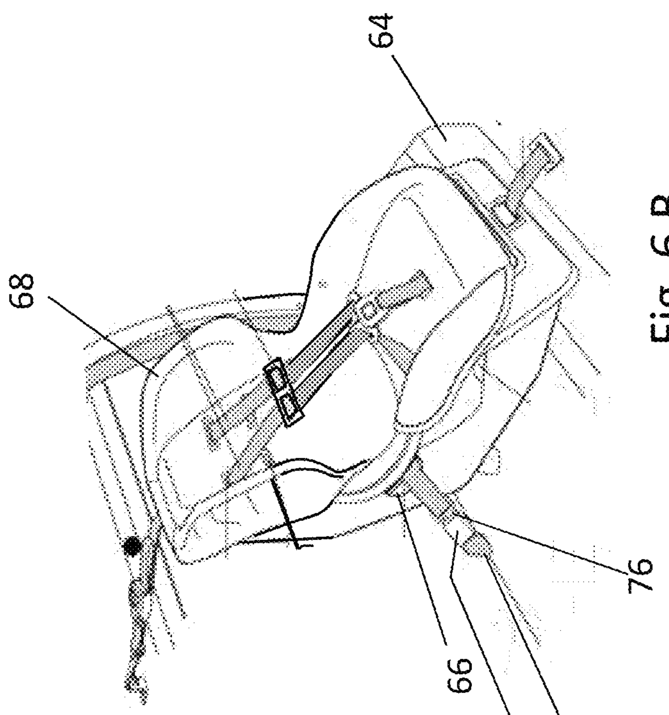
Figure 6:
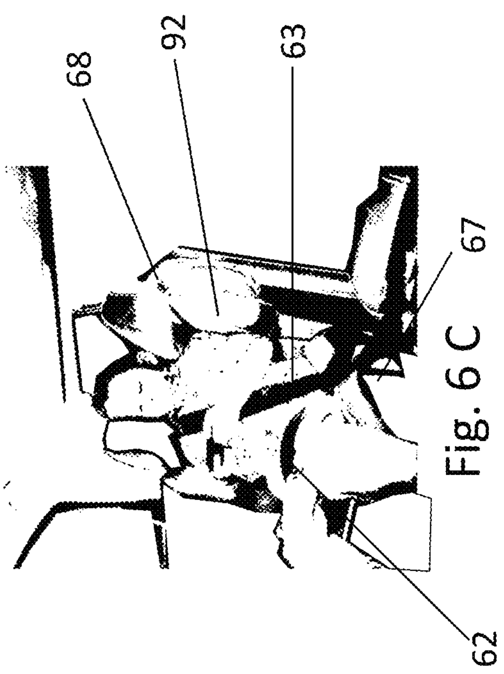
Figure 6:
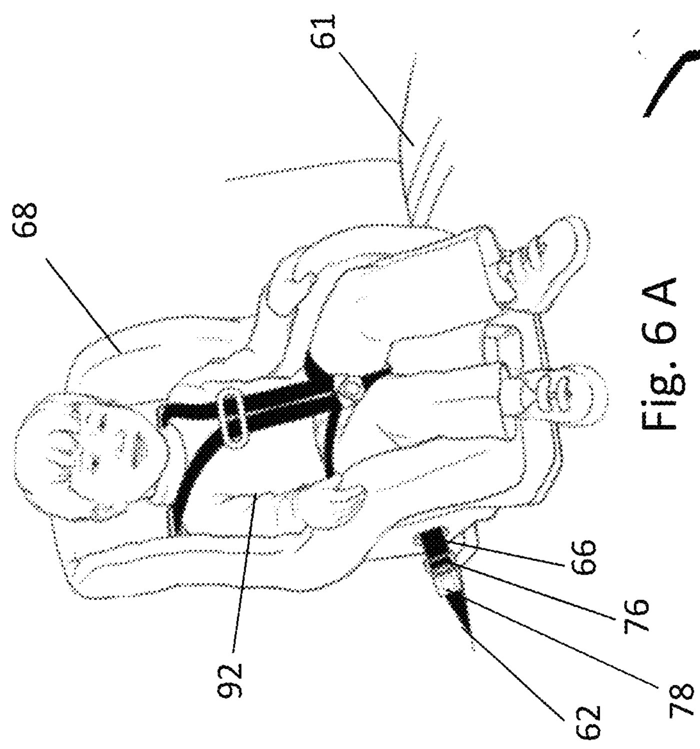

FIGS. 6 A through 6 C are sketches of front facing infant/child car seats shown with seat belt interconnects.

Figure 7:
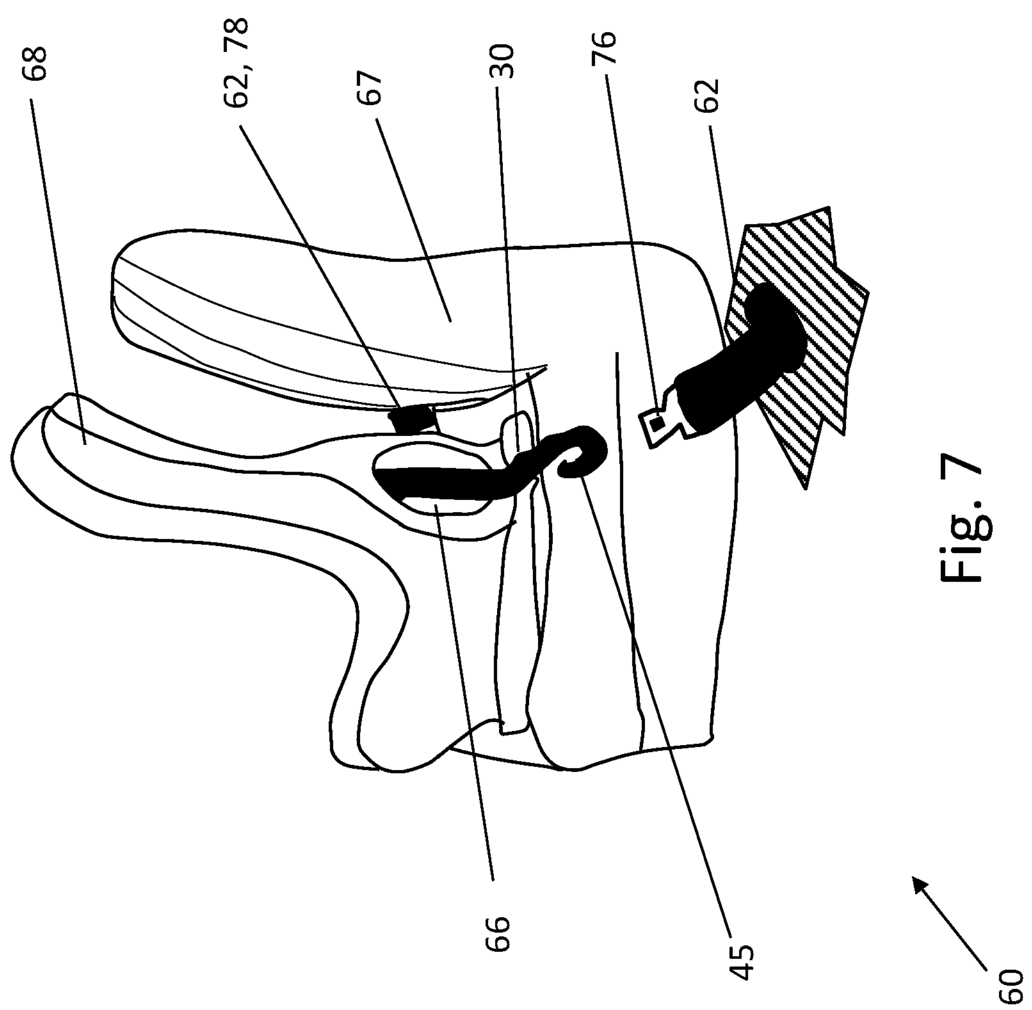

FIG. 7 is a sketch of the seat belt strap pull theory device being used with a car seat and a vehicle seat belt.

FIGS. 8 A through 8 E are sketches of prior art seat belt and car seat devices.

DESCRIPTION OF THE DRAWINGS—REFERENCE NUMERALS

The following list refers to the drawings: Table B: Reference numbers

| Ref # | Description |
|---|---|
| 30 | seat belt strap pull through device 30 for a car seat called a Buckleze Pull |
| 31 | prototype 31 of seat belt pull through device 30 |
| 35 | extended sheath 35 with insert end 36 and hook end 38 |
| 36 | insert end 36 of device 30 |
| 37 | tapered or pointed end 37 of insert end 36 |
| 38 | hook end 38 |
| 39 | view 39 of seat belt pull through device 30 with a pair of protector flaps 40 |
| 40 | pair of protector flaps 40 made of flexible and durable material, over hook 45 |
| 45 | hook 45 of device 30 |
| 45A | alternative hook 45A with clip spring 47 |
| 46 | encircling feature 46 of hook 45, 45A |
| 47 | spring clip 47 |
| 48 | means to connect 48 hook 45 or alternate hook 45A to hook end 38 of device such as sewing with thread, adhesive, ultra-sonic welding, rivets, snaps or integrally molding |
| 49 | means to connect 49 the pair of flaps to the hook end 38 of device 30 such as sewing with thread, adhesive, ultra-sonic welding, rivets, snaps or integrally molding |
| 50 | means to connect 50 spring clip 47 to alternate hook 45A, means such as such as adhesive, ultra-sonic welding, epoxy, friction welding, brazing, rivets, or integrally molding |
| 60 | operation view 60 of the device 30 and a car seat 65, 68 and vehicle seat 61, 64, 67 |
| 61 | triple vehicle seat 61 |
| 62 | lap seat belts 62 |
| 63 | shoulder belt 63 |
| 64 | double vehicle seat 64 |
| 65 | rear facing child seat 65 |
| 66 | slot for belts 62, 63 |
| 67 | single car seat 67 |
| 68 | front facing infant/child car seat 68 |
| 70 | solid, patterned (flowers, geometric, animals, vegetation, celestial) or other decorative cover 70 over device 30 |
| 75 | LED light and battery power system 75 |
| 76 | male insert 76 of the seatbelt buckle with a length adjuster |
| 78 | female receiver 78 of the seatbelt buckle |
| 90 | operator/user 90 |
| 91 | baby 91 |
| 92 | infant/child 92 |
| 101 | prior art 101 U.S. Pat. No. 6,827,400 |
| 102 | prior art 102 U.S. Pat. No. 6,969,122 |
| 103 | prior art 103 U.S. Pat. No. 6,343,841 |
| 104 | prior art 104 U.S. Application 20063/0267394 |
| 105 | prior art 105 U.S. Pat. No. 4,641,235 |

DETAILED DESCRIPTION OF PREFERRED EMBODIMENT

The present development is a seat belt pull through device for a car seat called a Buckleze Pull. This invention is in the field for securing web belts such as seat belts. The invention relates generally to an assist device for vehicular safety devices and systems for use in a vehicle that allows an occupant, e.g., a child, to comfortably sleep in a semi-erect or upright position while wearing conventional lap and shoulder safety belts. The present device is a pull through device to assist attaching the car seat to the existing seat belt system of a vehicle. The present disclosure assists the placement of a child seat which typically includes a base held in place on an underlying passenger seat by an anchor belt coupled to the vehicle and a juvenile seat coupled to the base. The present device is an article of manufacture, and a method for attaching a child safety seat in a vehicle and, in particular to a device, an article of manufacture, and a method, enabling a quick and efficient way to fasten and release the belt buckles which fix the child safety seat or child sitting in the child booster safety seat to the seat's location on the vehicle seat.

The advantages for the seat belt pull through device 30 for a car seat called a Buckleze Pull are listed above in the introduction. Succinctly the benefits are that the device:

A. Helps parents and grandparents manage strap;
B. Prevents cramps and injuries connecting child seat;
C. Is ergonomically built;
D. Can be made from available materials and processes;
E. Is a universal size for all car seats;
F. Is used without additional tools;
G. Facilitates attaching of car seat to vehicle; and
H. Reduces need to purchase car seats for each vehicle owned.

The preferred embodiment is a seat belt pull through device 30 for a car seat 65, 68 called a Buckleze Pull an accessory to facilitate the attachment of a car seat 65, 68 to a vehicle seat belt system 62,63, the device 30 is made of durable materials and is comprised of: (a) an extended sheath 35 with an insert end 36 and a hook end, the insert end 36 further comprised with a tapered or pointed end 37 and the hook end 38 further comprised of a hook 45; (b) a pair of protector flaps 40 made of flexible and durable material, situated and contiguous with the hook 45; (c) a means to connect 48 hook 45 to hook end 38 of device 30, and (d) a means to connect 49 the pair of flaps 40 to the hook end 38 of device 30 wherein the device is inserted into a seat belt slot 66 of the car seat 65, 68 and pushed through and removably connected to the seat belt system 65, 68 of the vehicle.

There is shown in FIGS. 1-8 a complete description and operative embodiment of the seat belt pull through device for a car seat called a Buckleze Pull. In the drawings and illustrations, one notes well that the FIGS. 1-8 demonstrate the general configuration and use of this product. The various example uses are in the operation and use section, below.

The accompanying drawings, which are incorporated in and constitute a part of this specification, illustrate an embodiment of the seat belt pull through device 30 for a car seat called a Buckleze Pull that is preferred. The drawings together with the summary description given above and a detailed description given below serve to explain the principles of the pull through device 30. It is understood, however, that the pull through device 30 is not limited to only the precise arrangements and instrumentalities shown. Other examples of belt pull through devices and uses are still understood by one skilled in the art of seat belts, vehicle seats and car seats and similar art to be within the scope and spirit shown here.

FIGS. 1 A through 1 D are sketches of the general seat belt pull through device 30 for a car seat called a Buckleze Pull. Shown in these views are: a seat belt strap pull through device 30 for a car seat called Buckleze Pull; prototype 31 of seat belt pull through device 30; a view 39 of seat belt pull through device 30 with protector flaps 40; and operation view 60 of the device 30 and a car seat 65, 68 and vehicle seat 61, 64, 67.

FIGS. 2 A through 2 G are sketches of the general seat belt pull through device 30 with components and features noted. Provided in these sketches are: a seat belt strap pull through device 30 for a car seat called Buckleze Pull; prototype 31 of seat belt pull through device 30; an extended sheath 35 with insert end 36 and hook end 38; an insert end 36 of device 30; a tapered or pointed end 37 of insert end 36; a hook end 38; a view 39 of seat belt pull through device 30 with protector flaps 40; a pair of protector flaps 40 made of flexible and durable material, over hook 45; a hook 45 of device 30; an alternative hook 45A with clip spring 47; an encircling feature 46 of hook 45, 45A; a spring clip 47; a means to connect 48 hook 45 or alternate hook 45A to hook end 38 of device such as sewing with thread, adhesive, ultra sonic welding, rivets, snaps or integrally molding; a means to connect 49 the pair of flaps to the hook end 38 of device 30 such as sewing with thread, adhesive, ultra-sonic welding, rivets, snaps or integrally molding; a means to connect 50 spring clip 47 to alternate hook 45A means such as such as adhesive, ultra-sonic welding, epoxy, friction welding, brazing, rivets, or integrally molding; a solid, patterned (flowers, geometric, animals, vegetation, celestial) or other decorative cover 70 over device 30; and a LED light and battery power system 75. The pull through device sheath 35 anticipates a durable material, for example and not limitation, fabric, canvas, composite material, plastic, or synthetic and natural fabric. The hook 45 anticipates materials, for example and not limitation, metal, aluminum, steel, plastic, and composite material. And the protector flaps 40 anticipates materials, for example and not limitation, a thin, flexible plastic, acrylic, composite material, and a stiff fabric. Battery types anticipate chemistry such as Lithium Ion, Lithium Phosphate, Lithium Polymer, Nickel Metal Hydride, Nickle cadmium, Nickel Zinc, alkaline button, alkaline cylinder, and alkaline box.

FIG. 3 A through 3 D are more sketches of the seat belt strap pull through device 30 with the components shown from generally a top view. Here are demonstrated: a prototype 31 of seat belt pull through device 30; an extended sheath 35 with insert end 36 and hook end 38; an insert end 36 of device 30; a tapered or pointed end 37 of insert end 36; a hook end 38; a view 39 of seat belt pull through device 30 with protector flaps 40; a pair of protector flaps 40 made of flexible and durable material, over hook 45; a hook 45 of device 30; a means to connect 49 the pair of flaps to the hook end 38 of device 30 such as sewing with thread, adhesive, ultra-sonic welding, rivets, snaps or integrally molding; a male insert 76 of the seatbelt buckle with a length adjuster; and an operator/user 90.

FIGS. 4 A through 4 C are sketches automobile and vehicle seats with seat belt arrangements shown. These are typical representation, but not limitations, of the kind of seats where the car seats are placed and the device 30 is used. Provided in these sketches are: a triple vehicle seat 61; a lap seat belt 62; a shoulder belt 63; and a double vehicle seat 64.

FIGS. 5 A through 5 E are sketches of rear facing baby car seats with seat belt interconnects shown. Shown are: a triple vehicle seat 61; a lap seat belt 62; a shoulder belt 63; a rear facing child seat 65; a slot 66 for belts 62,63; and a baby 91.

FIGS. 6 A through 6 C are sketches of front facing infant/child car seats 68 shown with seat belt interconnects. These sketches provide and demonstrate: a triple vehicle seat 61; a lap seat belt 62; a double vehicle seat 64; a slot for belts 62, 63; a single car seat 67; a front facing infant/child car seat 68; a male insert 76 of the seatbelt buckle with a length adjuster; a female receiver 78 of the seatbelt buckle; and an infant/child 92.

FIG. 7 is a sketch of the seat belt strap pull through device 30 being used with a car seat and a vehicle seat belt. This is described in the operation section below.

FIGS. 8 A through 8 E are sketches of prior art seat belt and car seat devices. Here former patents and applications for various seat belt devices are shown. These include: prior art 101 U.S. Pat. No. 6,827,400; prior art 102 U.S. Pat. No. 6,969,122; prior art 103 U.S. Pat. No. 6,343,841; prior art 104 US Application 20063/0267394; and prior art 105 U.S. Pat. No. 4,641,235. As can be seen, the seat belt pull through device for a car seat called a Buckleze Pull is a unique combination and use as described herein.

The details mentioned here are exemplary and not limiting. Other specific components and manners specific to describing a seat belt pull through device for a car seat called a Buckleze Pull 30 may be added as a person having ordinary skill in the field of the art of seat belts, vehicle seats, car seats for babies and infants and other pull through devices and their uses well appreciates.

Operation of the Preferred Embodiment

The seat belt pull through device 30 for a car seat called a Buckleze Pull has been described in the above embodiment. The manner of how the device operates is described below. One notes well that the description above and the operation described here must be taken together to fully illustrate the concept of the seat belt pull through device 30. The preferred embodiment of the seat belt pull through device 30 for a car seat 65, 68 called a Buckleze Pull an accessory to facilitate the attachment of a car seat 65, 68 to a vehicle seat belt system 62,63, the device 30 is made of durable materials and is comprised of: (a) an extended sheath 35 with an insert end 36 and a hook end, the insert end 36 further comprised with a tapered or pointed end 37 and the hook end 38 further comprised of a hook 45; (b) a pair of protector flaps 40 made of flexible and durable material, situated and contiguous with the hook 45; (c) a means to connect 48 hook 45 to hook end 38 of device 30, and (d) a means to connect 49 the pair of flaps 40 to the hook end 38 of device 30.

The seat belt pull through device 30 for a car seat called a Buckleze Pull is used or operated as follows: the seat belt pull through device 30 at the insert end 36 of device 30 is removably attached to the male insert 76 of a lap seat belt 62. The device is then fed through the slot 66 of a car seat such as a front facing infant/child car seat 68 or rear facing seat 65. The device 30 and seat belt system 62,63 is then pulled through with the protective flaps 40 allowing it to not jam or stick. Once through the male insert 76 is detached from the device and connected to the female buckle 78 of the seat belt. The belt is adjusted tight and the car seat 65, 68 is ready to accept the baby 91 or infant/child 92.

FIG. 7 is a sketch of the seat belt strap pull through device 30 being used with a car seat and a vehicle seat belt. In this operation sketch 60 is shown a seat belt strap pull through device 30 for a car seat called Buckleze Pull; an insert end 36 of device 30; a lap seat belt 62; a (large) slot 66 for belts 62, 63; a single car seat 67; a front facing infant/child car seat 68; and a male insert 76 of the seatbelt buckle with a length adjuster. FIG. 3 D also shows the simple operation. Here the main hook 45 is shown ready to engage the male insert 76 of the seat belts 62, 63.

With this description it is to be understood that the seat belt pull through device 30 for a car seat called a Buckleze Pull is not to be limited to only the disclosed embodiment of product. The features of the seat belt pull through device 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

What is claimed is:

1. A seat belt pull through device (30) for a car seat (65),(68) that facilitates attachment of the car seat (65),(68) to a vehicle seat belt system (62), (63), the device (30) is made of durable materials and is comprised of:
- (a) an extended sheath (35) with an insert end (36) and a hook end (38), the insert end (36) further comprised of a tapered or pointed end (37) and the hook end (38) further comprised of a hook (45);
- (b) a pair of protector flaps (40) made of flexible and durable material, situated and contiguous with the hook (45);
- (c) a means to connect (48) the hook (45) to the hook end (38) of the device (30), and
- (d) a means to connect (49) the pair of protector flaps (40) to the hook end (38) of the device (30)

wherein the device is inserted into a seat belt slot (66) of the car seat (65), (68) and pushed through and removably connected to the seat belt system (65), (68) of a vehicle.

2. The seat belt pull through device (30) for the car seat (65), (68) in claim 1 wherein the extended sheath (35) is selected from a group consisting of canvas, composite material, plastic, synthetic fabric, and natural fabric.

3. The seat belt pull through device (30) for the car seat (65), (68) in claim 1 wherein the material of the pair of protector flaps (40) is selected from a group consisting of thin and flexible plastic, acrylic, composite material, and a stiff fabric.

4. The seat belt pull through device (30) for the car seat (65), (68) in claim 1 wherein a material of the hook (45) is selected from a group consisting of metal, aluminum, steel, plastic, and composite material.

5. The seat belt pull through device (30) for the car seat (65), (68) in claim 1 wherein the means to connect (48) the hook (45) to the hook end (38) is selected from a group consisting of sewing with thread, adhesive, ultrasonic welding, rivets, snaps and integrally molding.

6. The seat belt pull through device (30) for the car seat (65), (68) in claim 1 wherein the means to connect (49) the protector flaps (40) to the hook end (38) is selected from a group consisting of sewing with thread, adhesive, ultrasonic welding, rivets, snaps and integrally molding.

7. The seat belt pull through device (30) for the car seat (65), (68) in claim 1 wherein the device (30) is further comprised of a decorative cover (70).

8. The seat belt pull through device (30) for the car seat (65), (68) in claim 7 wherein the decorative cover (70) is selected from a group consisting of a solid and a patterned design.

9. The seat belt pull through device (30) for the car seat (65), (68) in claim 8 wherein the patterned design is selected from a group consisting of flowers, geometric, animals, vegetation, and celestial.

10. The seat belt pull through device (30) for the car seat (65), (68) in claim 1 wherein the device (30) is further comprised of an LED light and a battery power system (75) that is based on a type of battery.

11. The seat belt pull through device (30) for the car seat (65), (68) in claim 10 wherein the type of battery is selected from a group consisting of Lithium Ion, Lithium Phosphate, Lithium Polymer, Nickel Metal Hydride, Nickle cadmium, Nickel Zinc, alkaline button, alkaline cylinder, and alkaline box.

12. A seat belt pull through device (30) for a car seat (65), (68) that facilitates attachment of the car seat (65),(68) to a vehicle seat belt system (62), (63), the device (30) is made of durable materials and is comprised of:
- (a) an extended sheath (35) with an insert end (36) and a hook end (38), the insert end (36) further comprised of a tapered or pointed end (37) and the hook end (38) further comprised of a hook (45);
- (b) a pair of protector flaps (40) made of flexible and durable material, situated and contiguous with the hook (45);
- (c) a sewing to connect the hook (45) to the hook end (38) of the device (30), and
- (d) an adhesive to connect the pair of protector flaps (40) to the hook end (38) of the device (30)

wherein the device is inserted into a seat belt slot (66) of the car seat (65), (68) and pushed through and removably connected to the seat belt system (65), (68) of a vehicle.

13. The seat belt pull through device (30) for the car seat (65), (68) in claim 12 wherein the device (30) is further comprised of a decorative cover (70).

14. The seat belt pull through device (30) for the car seat (65), (68) in claim 13 wherein the decorative cover (70) is selected from a group consisting of a solid and a patterned design.

15. The seat belt pull through device (30) for the car seat (65), (68) in claim 14 wherein the patterned design is selected from a group consisting of flowers, geometric, animals, vegetation, and celestial.

16. The seat belt pull through device (30) for the car seat (65), (68) in claim 12 wherein the device (30) is further comprised of an LED light and a battery power system (75) that is based on a type of battery.

17. The seat belt pull through device (30) for the car seat (65), (68) in claim 16 wherein the type of battery is selected from a group consisting of Lithium Ion, Lithium Phosphate, Lithium Polymer, Nickel Metal Hydride, Nickle cadmium, Nickel Zinc, alkaline button, alkaline cylinder, and alkaline box.

18. A seat belt pull through device (30) for a car seat (65),(68) that facilitates attachment of the car seat (65),(68) to a vehicle seat belt system (62), (63), the device (30) is made of durable materials and is comprised of:

(a) an extended sheath (35) with an insert end (36) and a hook end (38), the insert end (36) further comprised of a tapered or pointed end (37) and the hook end (38) further comprised of an alternate hook (45A) with a spring clip(47);

(b) a pair of protector flaps (40) made of flexible and durable material, situated and contiguous with the alternate hook (45A) with a spring clip (47);

(c) a means to connect (50) the alternate hook (45A) to the spring clip (47);

(d) a means to connect (48) the alternate hook (45A) with the spring clip (47) to the hook end (38) of the device (30), and (e) a means to connect (49) the pair of protector flaps (40) to the hook end (38) of the device (30)

wherein the device is inserted into a seat belt slot (66) of the car seat (65), (68) and pushed through and removably connected to the seat belt system (65), (68) of a vehicle.

19. The seat belt pull through device (30) for the car seat (65),(68) in claim 18 wherein the means (50) to connect the alternate hook(45A) to the spring clip (47) is selected from a group consisting of adhesive, ultrasonic welding, epoxy, friction welding, brazing, rivets, and integrally molding.

* * * * *